United States Patent Office 3,317,404
Patented May 2, 1967

3,317,404
PRODUCTION OF METABOLIC PRODUCTS OF GRAM-POSITIVE BACTERIA AND STREPTOMYCES BY THE ADDITION OF KINETIN TO THE FERMENTATION BROTH
Paul Präve, Hofheim, Taunus, and Gerhard Huber, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Jan. 24, 1966, Ser. No. 522,403
Claims priority, application Germany, May 22, 1962, F 36,853
5 Claims. (Cl. 195—80)

This is a continuation-in-part of U.S. patent application Ser. No. 280,312, filed May 14, 1963, now abandoned.

The present invention relates to improving the production of metabolic products of gram-positive bacteria and Streptomyces by the addition of kinetin to the fermentation broth of the respective microorganisms.

It is known that kinetin (6-furfurylaminopurine) obtained for the first time in 1955 in the form of crystals from calf's thymus-desoxyribonucleic acid and later prepared synthetically, brings about an increase in segmentation frequency especially in plants. Summarizing reports have been given by F. M. Strong (topics in Microbial Chemistry, N.Y., J. Wiley & Sons, Inc., 1958) and B. Parthier [Pharmazie 15, 696 (1960)]. Kinetin has also been found to cause an accelerated growth rate when applied on *Eschericia coli*, a gram negtive bacteria (D. Kennell, Experimental Cell Research 21, 19–33 (1960)). However the action of kinetin in improving the production of valuable metabolic products of microorganisms, for example antibiotics, amino acids, enzymes and other products which can be prepared fermentatively has not heretofore been known. The production of metabolic products from *E. coli* (colicines) is not improved when kinetin is added.

Now we have found a process for increasing the yield of antibiotics and other metabolic products from gram-positive bacteriae and Streptomyces with fermentative breeding which process comprises adding kinetin to the fermentation broth in an amount ranging from 0.001–100γ ml. (micrograms/milliliter), preferably 0.01–50γ/ml., and fermenting and obtaining the active substances in the usual manner.

The addition of kinetin to the fermentation broth also stimulates the growth rate of the microorganisms. However it is to be noted that the increase in the amount of antibiotics or other metabolism products produced markedly exceed the increase in growth; i.e. the process of the invention results in an increase in product yield per unit weight of the cell material.

The amount of kinetin necessary to produce the desired results varies according to the microorganism with which it is used.

Kinetin may be added to the fermentation broth as a sterile crystalline preparation or in the form of a sterile aqueous solution having an appropriate concentration, advantageously prior to the beginning of the fermentation process.

The fermentation may be carried out in the usual manner; for example in shaking cultures or fermenters, preferably under aerobic conditions.

For carrying out the process, a strain of *Streptomyces aureofaciens* NRRL 2209, for example, after being pre-cultivated in an appropriate nutrient medium, is cultivated for 5 days at 28° C. in a shaking culture while adding kinetin to the fermentation broth (final concentration 0.3 or 1.5γ/ml. of kinetin). The results are given in Table 1.

When using a fermenter instead of a shaking culture for the process, similar effects are obtained. When fermenting for 4 days at 28° C. on a 2 liter or 10 liter scale, an addition of kinetin (0.03γ/ml. or 0.01γ/ml.) to the fermentation broth results in an increase of the tetracyline content of between 11 and 26 percent (Examples 2 and 3).

The process may also be applied to Streptomyces strains which form other antibiotics. As shown in Example 4, Table 4, the content of novobiocin in the fermentation broth is increased by 42–63% by the addition of kinetin when cultivating the novobiocin forming strain *Streptomyces niveus* NRRL 2449 for 5 days at 28° C. For obtaining an optimum effect in this case, higher concentrations of kinetin ranging between 1 and 50γ/ml. are required.

In a similar manner, the production of Moenomycin (German Patent No. 1,113,791) can be increased by 20% by the addition of 1.5γ of kinetin per ml. of fermentation broth containing *Streptomyces ghanaensis* ATCC No. 14672 (cf. Example 5).

In addition to the aforementioned organisms, kinetin may also be used with good results, for example, with other Streptomyces which form antibiotics such as *Streptomyces griseus* (Streptomycin), *Streptomyces ederensis* (Moenomycin), *Streptomyces bambergiensis* (Moenomycin), *Streptomyces geysiriensis* (Moenomycin), *Streptomyces aureofaciens* (tetracycline, chlorotetracycline) *Streptomyces rimosus* (oxytetracycline), *Streptomyces chrysomallus* (Actinomycin) and *Streptomyces fradiae* (Neomycin) and gram-positive bacteria such as *Bacillus cereus*, *Bacillus subtilis* (Bacitracin) *Bacillus colistinus* (Colistin). *Bacillus thuringiensis* (Toxine), Micrococcus spec. ATCC 17901 (Urease) and *Clostridium butyrcum*.

The following examples serve to illustrate the invention but they are not intended to limit it thereto.

Example 1

A nutrient solution was prepared containing

| | |
|---|---:|
| Cane sugar _____ grams__ | 20 |
| Corn steep liquor _____ do____ | 15 |
| Cottonseed fluor _____ do____ | 5 |
| $(NH_4)_2SO_4$ _____ do____ | 2 |
| $CaCO_3$ _____ do____ | 3 |
| $ZnSO_4 \cdot 2H_2O$ _____ do____ | 0.03 |
| and | |
| Distilled water _____ ml____ | 1000 |

35 milliliters of this nutrient solution were filled into 300-ml. Erlenmeyer flasks and sterilized in the usual manner. From agar slant tubules, the solution in the flasks was inoculated with the tetracycline-forming strain *Streptomyces aureofaciens* NRRL 2209 and the flasks were shaken for 2 days at 28° C. A main culture solution was then prepared having the following composition:

| | Percent |
|---|---:|
| Soyabean groats _____ | 2.31 |
| Cane sugar _____ | 6.95 |
| $(NH_4)_2SO_4$ _____ | 0.58 |
| $CaCo_3$ _____ | 1.15 |
| Cottonseed flour _____ | 1.75 |
| Dry yeast _____ | 0.23 |
| NaBr _____ | 0.002 |
| Mercaptobenzothiazole _____ | 0.04 |
| Soyabean oil _____ | 0.85 |
| β-indolyl-acetic acid _____ | 0.0005 |
| Final pH _____ | 8.0 |
| Water, remainder. | |

35 milliliters each of this main culture were introduced into 300-ml. Erlenmeyer flasks and sterilized in the usual manner. The solution in each of the flasks was inoculated with 1 milliliter of the preculture and then mixed with a kinetin solution which had been filtered under sterile conditions so that the final concentration of kinetin was 0.3γ or 3.0γ per milliliter. The control solution did not contain kinetin. The batch was shaken at 28° C., part thereof was withdrawn after 4 days, another part after 5 days. The culture solution was worked up and the activity of the tetracycline formed was tested turbidimetrically with *Straph. aureus* 209 P using USP Ref. Standard. The results are shown in the following Table 1 (average values from each 3 flasks).

TABLE I

| Kinetin, γ/ml. | Tetracycline | | Cell mass (dry), mg./ml. | Tetracycline/dry cell mass | |
|---|---|---|---|---|---|
| | γ/ml. | Percent of the control | | γ/mg. | Percent of the control |
| 4 days { 0 | 2,000 | 100 | 26.5 | 75.5 | 100 |
| 0.3 | 2,400 | 120 | 26.1 | 92 | 123 |
| 3.0 | 2,500 | 125 | 27.5 | 91 | 121 |
| 5 days { 0 | 2,300 | 100 | 27.2 | 85 | 100 |
| 0.3 | 2,900 | 126 | 30.5 | 96 | 113 |
| 3.0 | 3,200 | 139 | 29.3 | 110 | 129 |

*Example 2*

The strain *Streptomyces aureofaciens* (NRRL 2209) was precultivated as described in Example 1. 35 milliliters of this preculture were introduced into 2-liter fermenters, or 70 milliliters thereof in 10-liter fermenters charged with the nutrient solution of the main culture described in Example 1. These fermenters were maintained at 28° C., their content was stirred and aerated. The kinetin content amounted to 0.03γ/ml. in the 2-liter fermenters and 0.01γ/ml. in the 10-liter fermenters. After 4 days of fermentation, the fermenter content was worked up and tested for its tetracycline content. (See the following Tables 2 and 3.)

TABLE 2

[Fermentation volume: 2 liters. Average values from 3 fermenters]

| Kinetin, γ/ml. | Tetracycline | | Cell mass (dry), mg./kg. | Tetracycline/dry cell mass | |
|---|---|---|---|---|---|
| | γ/ml. | Percent of the control | | γ/mg. | Percent of the control |
| 0 | 1,400 | 100 | 25.5 | 54.7 | 100 |
| 0.05 | 1,670 | 119 | 27.0 | 61.0 | 111 |
| 0.10 | 1,550 | 110 | 26.5 | 58.7 | 107 |

TABLE 3

[Fermentation volume: 10 liters]

| Kinetin, γ/ml. | Tetracycline, γ/ml. | Percent of the control |
|---|---|---|
| 0 | 1,900 | 100 |
| 0.01 | 2,100 | 111 |

*Example 3*

The novobiocin-forming strain *Streptomyces niveus* (NRRL 2449) was inoculated in 300-ml. Erlenmeyer flasks from an agar slant culture in 60 ml. of a liquid preculture having the following composition:

Amino acid mixture from degraded casein called "NZ-Amin" _____ grams__ 10
Bovril _____ do____ 3
Dextrose _____ do____ 10
Distilled water _____ mil__ 1000
pH 6.8–7.0.

After 3-days shaking at 28° C. on a shaking apparatus, 5 ml. of the preliminary culture were introduced into 300 ml. Erlenmeyer flasks charged with 60 ml. of the main culture solution having the following composition:

Dextrose _____ grams__ 40
"Distillers Solubles" _____ do____ 40
Distilled water _____ ml__ 1000
β-indolyl-acetic acid _____ mg__ 20 and a pH of 6.4–6.6.

Groups of 5 of these flasks were charged with kinetin in increasing incremental final concentrations of 50γ, 20γ 1γ and 0.1 γ/ml. A control without kinetin was prepared. The flasks were shaken for 5 days at 28° C., the mycelium formed was then separated and the remaining solution was evaluated with *Staph. aureus* 209 P in the cylinder plate test using a standard. The results are shown in the following Table 4 (average values from 5 flasks each).

TABLE 4

[Average values from 5 shaking flasks each]

| Kinetin, γ/ml. | Novobiocin, γ/ml. | Percent of the control |
|---|---|---|
| 0 | 40 | 100 |
| 0.1 | 40 | 100 |
| 1 | 57 | 142 |
| 20 | 65 | 163 |
| 50 | 60 | 150 |

*Example 4*

The Moenomycin-forming strain *Streptomyces ghanaensis* ATCC No. 14672 was inoculated from an agar slant tubule to a preliminary culture solution having the composition described below and the solution was shaken for 2 days at 28° C., 2 ml. of the preliminary culture were then inoculated on a main culture having the same composition and then incubated for 4 days while shaking. Preliminary culture and main culture consist each of 35 ml. of nutrient solution in 300-ml. Erlenmeyer flasks. The nutrient solution of both cultures had the following composition:

Cane sugar _____ grams__ 20
Corn steep liquor _____ do____ 15
Cottonseed flour _____ do____ 5
β-indolyl-acetic acid _____ mg__ 4
$(NH_4)_2SO_4$ _____ grams__ 2
$CaCO_3$ _____ do____ 3
$ZnSO_4 \cdot 2H_2O$ _____ do____ 0.03
Distilled water _____ mil__ 1000

3 flasks without kinetin and 3 flasks with kinetin at the final concentration of 1.5 γ/ml. were employed. After 4 days the mycelium was extracted with methanol and tested in a turbidimetric test with *Staph. aureus* 209 P (cf. of the following Table 5).

TABLE 5

[Average values from 3 shaking flasks each]

| Kinetin, γ/ml. | Moenomycin | | Cell mass (dry), mg./ml. | Moenomycin/dry cell mass | |
|---|---|---|---|---|---|
| | γ/ml. | Percent of the control | | γ/mg. | Percent of the control |
| 0 | 250 | 100 | 30.0 | 8.34 | 100 |
| 1.5 | 300 | 120 | 29.5 | 0.16 | 121 |

When using a 2-liter fermenter charged with 35 ml. of the preculture the following values were obtained:

TABLE 6

[Average values from 5 determinations]

| Kinetin, γ/ml. | Moenomycin | | Cell mass (dry), mg./ml. | Moenomycin/dry cell mass | |
|---|---|---|---|---|---|
| | γ/ml. | Percent of the control | | γ/mg. | Percent of the control |
| 0 | 550 | 100 | 32.0 | 17.1 | 100 |
| 1.0 | 750 | 136 | 33.5 | 22.4 | 131 |

Example 5

The strain Micrococcus U56B ATCC 17901 was kept on agar slant tubes using medium 3 (Difco) as the nutrient medium and subsequently floated off with physiological sodium chloride solution. The product was inoculated into 300 ml. Erlenmeyer flasks containing 95 ml. Difco medium 3 (liquid). The flasks were shaken on a shaking apparatus at +28° C. for 5 days. Then the cell mass was removed by centrifugation and the urease activity of the remaining solution was examined.

To carry out the urease test 0.1 g. glucose, 0.1 g. of casein peptone, 0.5 g. of sodium chloride and 1.8 of agar were dissolved in 80 ml. of water and sterilized at +55° C.; a solution, which has been filtered until sterile, of 0.2 g. of $KH_2PO_4$, 2.0 g. of ureau and 0.0012 g. of phenol red in 20 ml. of water was added and the mixture was allowed to solidify. Into the solidified substance holes were punched into which specimens of the separated culture solution were pipetted. Around the holes red zones developed, the diameters of which were measured to determine urease activity. The results are shown in Table 7:

TABLE 7

Urease activity of Micrococcus U56B ATCC No. 17901 influenced by kinetin

[Average values from 5 determination]

| Kinetin, γ/ml. | Dry cell mass, mg./10 ml. | Urease activity in mm. φ (red zone) |
|---|---|---|
| 0 | 11.8 | Traces |
| 0.1 | 13.0 | 15 |
| 0.5 | 9.6 | 17 |

We claim:
1. A process for increasing the production of antibiotics by gram-positive bacteria or Streptomyces during fermentative cultivation in a fermentation broth, which process comprises adding kinetin to said fermentation broth in an amount of from 0.001 to 100 microgram/ml.
2. A process as in claim 1 wherein kinetin is added to said fermentation broth in an amount of from 0.01–50 microgram/ml.
3. A process for increasing the production of urease by gram positive bacteria during fermentative cultivation in a fermentation broth, which process comprises adding kinetin to said fermentation broth in an amount of from 0.001 to 100 microgram/ml.
4. A process as in claim 3 wherein Micrococcus U56B ATCC 17901 is cultivated.
5. A process as in claim 3 wherein kinetin is added to said fermentation broth in an amount of from 0.01–50 microgram/ml.

References Cited by the Examiner

Kennell, D.: Experimental Cell Research 21, 19–33 (1960).

Spector (editor): Handbook of Toxicology, volume II, pages 57 and 58, published 1957 by Saunders Co., Philadelphia.

A. LOUIS MONACELL, *Primary Examiner.*

L. M. SHAPIRO, *Assistant Examiner.*